United States Patent
Lenz et al.

(10) Patent No.: US 7,336,899 B2
(45) Date of Patent: Feb. 26, 2008

(54) METHOD FOR DETERMINING THE DISPERSION CHARACTERISTICS OF MINIMUM PHASE FILTERS

(75) Inventors: Gadi Lenz, Fanwood, NJ (US); Magaly Spector, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 643 days.

(21) Appl. No.: 10/457,118

(22) Filed: Jun. 9, 2003

(65) Prior Publication Data

US 2004/0247321 A1 Dec. 9, 2004

(51) Int. Cl.
*H04B 10/08* (2006.01)
*H04B 17/00* (2006.01)

(52) U.S. Cl. .................. 398/29; 398/81; 398/147; 398/148; 398/159; 708/323

(58) Field of Classification Search .......... 398/29, 398/81, 147, 148, 159; 375/236; 708/323; 455/307
See application file for complete search history.

(56) References Cited

U.S. PATENT DOCUMENTS

| | | | |
|---|---|---|---|
| 6,370,300 B1 * | 4/2002 | Eggleton et al. ............ | 385/37 |
| 6,512,865 B1 * | 1/2003 | Shen et al. ................. | 385/24 |
| 6,654,516 B2 * | 11/2003 | So ............................ | 385/27 |
| 2002/0012493 A1 * | 1/2002 | Newell et al. ............. | 385/24 |

OTHER PUBLICATIONS

Kaiser S. Kunz, "Curve fitting", in AccessScience@McGraw-Hill, http://www.acccessscience.com, DOI 10.1036/1097-8542.174500, last modified: Jul. 27, 2000.*
G. Lenz et al., "Dispersive Properties of Optical Filters for WDM Systems," IEEE J. of Quantum Electronics, vol. 34, No. 8, Aug. 1998, pp. 1390-1402.
G. Nykolak et al., "Dispersion Penalty Measurements of Narrow Fiber Bragg Gratings at 10Gb/s," IEEE Photonics Tech. Lett., vol. 10, No. 9, Sep. 1998, pp. 1319-1321.
G. Lenz and L. E. Adams, "Dispersion and Crosstalk of Optical Minimum-Phase Filters in Wavelength Division Multiplexed Systems," Optical Fiber Comm. Conf., 1999 and the Int. Conf. on Integrated Optics and Optical Fiber Comm., OFC/IOOC '99 Technical Digest, pp. 168-170.

* cited by examiner

*Primary Examiner*—Jason Chan
*Assistant Examiner*—Wai Lun Leung (57) ABSTRACT

A method and apparatus for determining the dispersion characteristics of minimum phase filters using substantially only an amplitude response of a minimum phase filter under test includes fitting an amplitude spectrum of the minimum phase filter with a substantially straight line curve, and determining the dispersion characteristics of the minimum phase filter using the straight line curve and the relationships determined by the inventors. Various inventive equations determined by the inventors representative of the relationship between an amplitude response of a minimum phase filter and the dispersion characteristics of the minimum phase filter are used for determining the dispersion characteristics of the minimum phase filter.

17 Claims, 5 Drawing Sheets

METHOD FOR DETERMINING THE DISPERSION CHARACTERISTICS OF MINIMUM PHASE FILTERS

FIELD OF THE INVENTION

This invention relates to the field of optical filters and, more specifically, to determining the dispersion characteristics of optical filters used in wavelength division multiplexed systems.

BACKGROUND OF THE INVENTION

Wavelength division multiplexing (WDM) is pervasive in optical communication systems. Key optical components in these systems are those that perform the function of combining (multiplexing) various wavelength channels and splitting (demultiplexing) those channels. The multiplexing of various wavelength channels in current WDM systems is considered a relatively simple task and can be achieved with a component such as a star coupler.

Demultiplexing, however, requires optical spectral filters and is considered a much more challenging aspect of WDM systems when real system constraints are applied. In optical spectral filters, ideally, signals in the passband should emerge undistorted and other signals should be rejected. This implies an infinitely steep passband edge, a flat passband and constant group delay across the passband (i.e., square response). In practice however, the slope of the passband edge is finite and in most cases the group delay varies across the passband leading to phase distortion (i.e., dispersion).

Many optical filters used in WDM systems are inherently dispersive, which implies a nonlinear phase response. Furthermore, the amplitude and phase response are a Hilbert transform pair and therefore one uniquely determines the other. Such filters are known as minimum phase filters. It is important for the configuration of WDM systems to be able to characterize the phase and amplitude of such filters. The phase response of a filter is responsible for total time delay through the filter (first derivative of the spectral phase) and dispersion-induced pulse distortion (second and higher derivatives of the spectral phase response). However, while the amplitude response of filters is well understood and has received much attention, the phase response has only recently been investigated in the context of communication systems. While dispersion effects and dispersion compensation in optical fiber systems has been an active area of research, the dispersion associated with the filtering elements in the system have not been studied in detail.

SUMMARY OF THE INVENTION

The present invention advantageously provides a novel method and apparatus for determining the dispersion characteristics of optical filters.

In one embodiment of the present invention, a method for determining the dispersion characteristics of a minimum phase filter includes fitting an amplitude spectrum of the minimum phase filter with a substantially straight line curve, and determining the dispersion characteristics of the minimum phase filter using the straight line curve. The determined dispersion characteristics in accordance with one embodiment of the present invention may include the dispersion of the minimum phase filter, the group delay of the minimum phase filter, and the useable bandwidth of the minimum phase filter. Various inventive equations determined by the inventors representative of the relationship between an amplitude response of a minimum phase filter and the dispersion characteristics of the minimum phase filter are used for determining the dispersion characteristics of the minimum phase filter.

In another embodiment of the present invention, an apparatus for determining the dispersion characteristics of a minimum phase filter includes an optical source for providing an optical signal to the minimum phase filter, a detector for measuring the output of said minimum phase filter, and a controller comprising a memory for storing programs and instructions and a processor for executing the stored programs and instructions. The controller is adapted to perform the steps of fitting a transmission curve determined from the measured output of the minimum phase filter with a substantially straight line curve, and determining the dispersion characteristics of the minimum phase filter using the straight line curve. In one embodiment of the present invention the optical source and the detector are substantially a broadband light source and an optical spectrum analyzer, respectively. In another embodiment of the present invention, the optical source and the detector are substantially a tunable light source and a photodetector, respectively.

BRIEF DESCRIPTION OF THE DRAWINGS

The teachings of the present invention can be readily understood by considering the following detailed description in conjunction with the accompanying drawings, in which:

FIG. 2($a$) graphically depicts a plot of two transfer functions whose difference substantially results in the transfer function of FIG. 1;

FIG. 2($b$) graphically depicts a plot of the difference of the two transfer functions of FIG. 2($a$);

To facilitate understanding, identical reference numerals have been used, where possible, to designate identical elements that are common to the figures.

DETAILED DESCRIPTION OF THE INVENTION

The present invention advantageously provides a method for determining the dispersion characteristics of minimum phase filters. Although the concepts of the present invention will be described with respect to specific embodiments of minimum phase filters, it will be appreciated by those skilled in the art and informed by the teachings of the present invention, that the concepts of the present invention may be advantageously applied for determining the dispersion characteristics of substantially any minimum phase filter.

For minimum phase filters, such as transmissive thin film filters, transmissive Fabry-Perot filters, spatially symmetric fiber Bragg gratings as well as others, there exists a relation between the amplitude response (e.g., transfer function) and the phase response. By applying a simple transform to the amplitude response, the phase response may be yielded and vice versa. That is, if the amplitude response is measured over a sufficient spectral range, the phase response may be determined. Subsequently, by taking the first and second derivative of the determined phase response with respect to frequency, the group delay and dispersion of a minimum phase filter may be determined.

The inventors recognized that close in frequency to a change in the slope of an amplitude response of minimum phase filters there is an associated nonlinearity in phase which leads to large dispersion. This is a restatement of the Kramers-Kronig relation, which states that close to a material resonance, there is a corresponding dispersion in permitivity such that strict causality is obeyed. Using the above concepts, the inventors, herein, propose a method for quantifying the above described relationship, such that given an amplitude response of a minimum phase filter, the amount of dispersion incurred by the minimum phase filter can be determined. Throughout the disclosure the terms amplitude spectrum, amplitude response, transfer function and transmission curve are used interchangeably to depict the output power spectrum of a subject minimum phase filter.

It was assumed by the inventors, for the purposes of simplifying the following evaluation, that a subject minimum phase filter is symmetric around a central frequency. Further, it was assumed that the amplitude spectrum (e.g., transfer function) of the minimum phase filter could be approximated by straight lines when plotted on a logarithmic scale. That is, the amplitude spectra of minimum phase filters typically contain ripples in amplitude. The inventors propose fitting a known or measured amplitude spectrum of a subject minimum phase filter with a straight line curve substantially representative of the amplitude response of the minimum phase filter. Various means and methods for fitting a straight line curve to an amplitude spectrum of a minimum phase filter are available, such as averaging the maximum and minimum amplitude values of ripples in the spectrum and connecting the averaged values with a straight line, or simply drawing a straight line substantially representative of a portion of the spectra containing ripples, and as such, any such means for generating a straight line curve that is substantially representative of the amplitude response of a minimum phase filter are included within the concepts of the present invention.

Figure 1:
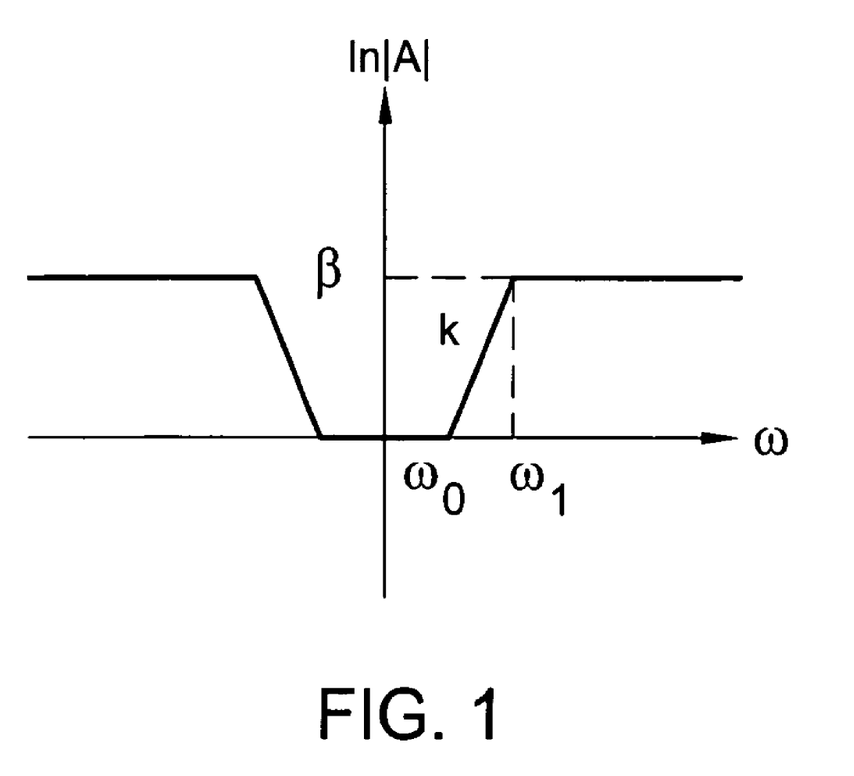
FIG. 1 graphically depicts a fitted straight line curve for the amplitude response curve of a minimum phase filter.

FIG. 1 graphically depicts a straight line curve of the amplitude spectrum (e.g., transfer function) of a minimum phase filter. In the graph of FIG. 1, the y-axis depicts positive attenuation and the x-axis is a linear frequency scale. As depicted in FIG. 1, the attenuation of the minimum phase filter is zero from $\omega=0$ to a "corner" frequency $\omega=\omega_0$, followed by a linear increase in attenuation (slope k) up to a frequency of $\omega=\omega_1$, where the attenuation becomes a constant again with an attenuation of $\beta$. This constant attenuation extends to infinite frequencies and depicts some relevant floor of the minimum phase filter (e.g., the crosstalk level). The approximated values for the minimum phase filter of FIG. 1, depicts exemplary values representative of most minimum phase optical filters. The analysis of the minimum phase filter FIG. 1 is kept relatively simple for clarity of explanation. If there is more structure in the transfer function of a minimum phase filter, more straight lines would need to be added to the figure.

Figure 2A:
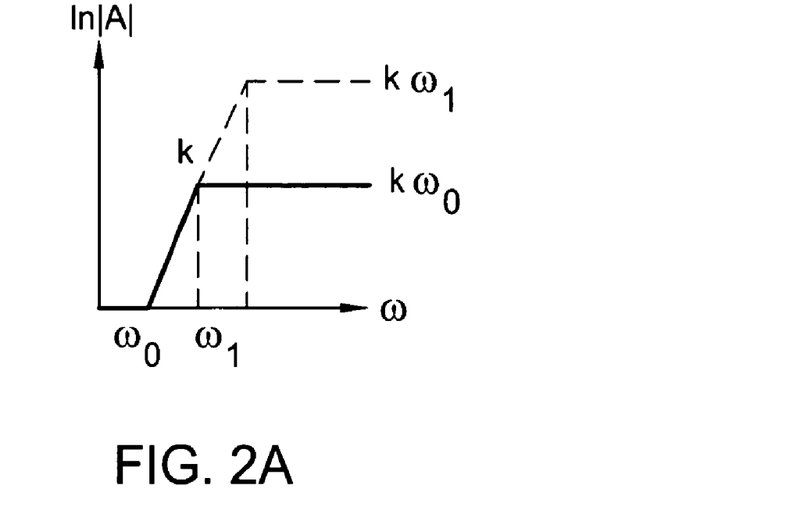

An amplitude spectrum (e.g., transfer function) of a minimum phase filter, such as the amplitude spectrum depicted in FIG. 1, may be comprised of two more basic transfer functions as shown in FIG. 2(a). FIG. 2(a) graphically depicts a plot of two transfer functions, where the y-axis depicts positive attenuation and the x-axis is a linear frequency scale. In FIG. 2(a), the attenuation of a first transfer function begins at zero at the y-axis, followed by a linear increase in attenuation (slope k) up to a frequency of $\omega=\omega_0$, where the attenuation becomes a constant again with an attenuation of $k\omega_0$. A second transfer function begins at zero at the y-axis, followed by a linear increase in attenuation (slope k) up to a frequency of $\omega=\omega_1$, where the attenuation becomes a constant again with an attenuation of $k\omega_1$. The constant attenuations extend to infinite frequencies and depict some relevant floor of the minimum phase filters (e.g., the crosstalk levels).

Figure 2B:
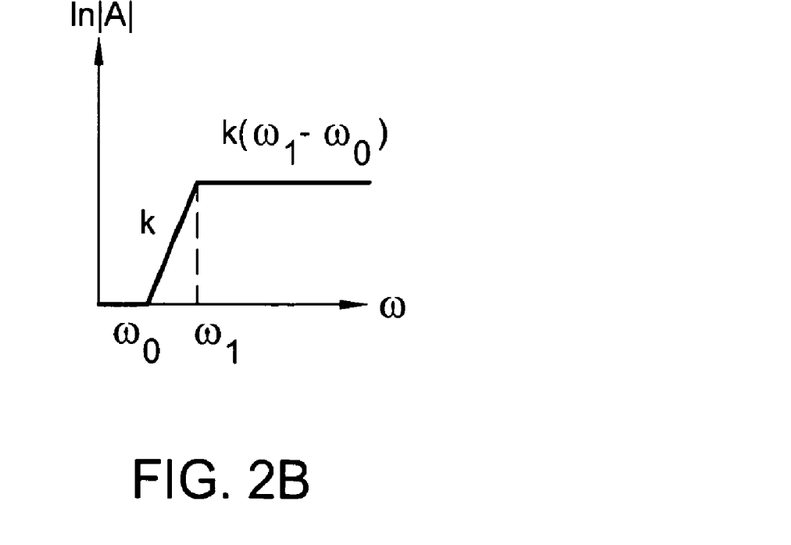

By taking the difference of the two transfer functions of FIG. 2(a), the original response of FIG. 1 may be reconstructed, as depicted in FIG. 2(b). FIG. 2(b) graphically depicts a plot of the difference of the two transfer functions of FIG. 2(a). In FIG. 2(b), the attenuation of a resultant transfer function is zero from $\omega=0$ to a "corner" frequency $\omega=\omega_0$, followed by a linear increase in attenuation (slope k) up to a frequency of $\omega=\omega_1$, where the attenuation becomes a constant again with an attenuation of $k(\omega_1-\omega_0)$.

By normalizing the frequency, the phase response associated with one of the fundamental transfer functions of FIG. 2(a) may be characterized according to equation one (1), which follows:

$$\phi(x) = \frac{k\omega_0}{\pi}((x+1)\ln(x+1) + (x-1)\ln(lx-1l) - 2x\ln x) \quad (1)$$

where k depicts the linear slope in attenuation, and x is the normalized frequency, $\omega/\omega_0$. Taking the difference between the two transfer functions depicted in FIG. 2a, with the same slope, k, and with corner frequencies $\omega_0$ and $\omega_1=\omega_0(1+2\alpha)$, respectively, results in the phase value of an ideal transfer function which may be characterized according to equation two (2), which follows:

$$\Phi(x) = \frac{k\omega_0}{\pi}\left[(1+2\alpha)\phi\left(\frac{x}{1+2\alpha}\right) - \phi(x)\right]. \quad (2)$$

In equation (2) above, $\alpha$ depicts a parameter representative of the spectral width of the slope region (e.g., the transition region) divided by the bandwidth of a subject minimum phase filter. The value of $\alpha$ may be characterized according to equation three (3), which follows:

$$\alpha = \frac{\beta}{2k\omega_0} = \frac{\delta\omega_{ir}}{\Delta\omega_j} \quad (3)$$

where $\delta\omega_{ir}$ is the spectral width of the slope region (e.g., the transition region) and $\Delta\omega_j=2\omega_0$ is the bandwidth of the filter.

Considering that the linear increase in attenuation is, over a frequency range, given by $2\alpha\omega_0$, and representing the level of the final attenuation by $\beta$, the slope, k, of a transfer function may be depicted by $k=\beta/2\alpha\omega_0$. As such, equation (2) above may be simplified according to equation four (4), which follows:

$$\Phi(x) = \frac{\beta}{2\alpha\pi}\left[(1+2\alpha)\phi\left(\frac{x}{1+2\alpha}\right) - \phi(x)\right]. \quad (4)$$

As such, the phase response of a minimum phase filter may be determined from the amplitude response by measuring the amplitude spectrum or using a known amplitude spectrum of a minimum phase filter and applying equation (4) above.

Taking the derivative of the phase response of equation (4) above with respect to x derives the group delay of a minimum phase filter. As such, the group delay of a subject minimum phase filter may be characterized according to equation five (5), which follows:

$$\tau(x) = \frac{\beta}{2\alpha\pi}\ln\left[\left(\frac{x+1+2\alpha}{x+1}\right)\left|\frac{x-1-2\alpha}{x-1}\right|\right]. \quad (5)$$

Equation (5), depicting the group delay, is then normalized by its value at $\omega_0$ (i.e., at the center of the minimum phase filter). A relative increase in group delay as the frequency is offset from the central frequency of a minimum phase filter may then be characterized according to equation six (6), which follows:

$$\tau_{norm}(x) = \frac{1}{2}\left[\ln\left[\left(\frac{x+1+2\alpha}{x+1}\right)\left|\frac{x-1-2\alpha}{x-1}\right|\right]\Big/\ln(1+2\alpha)\right]. \quad (6)$$

Figure 3:
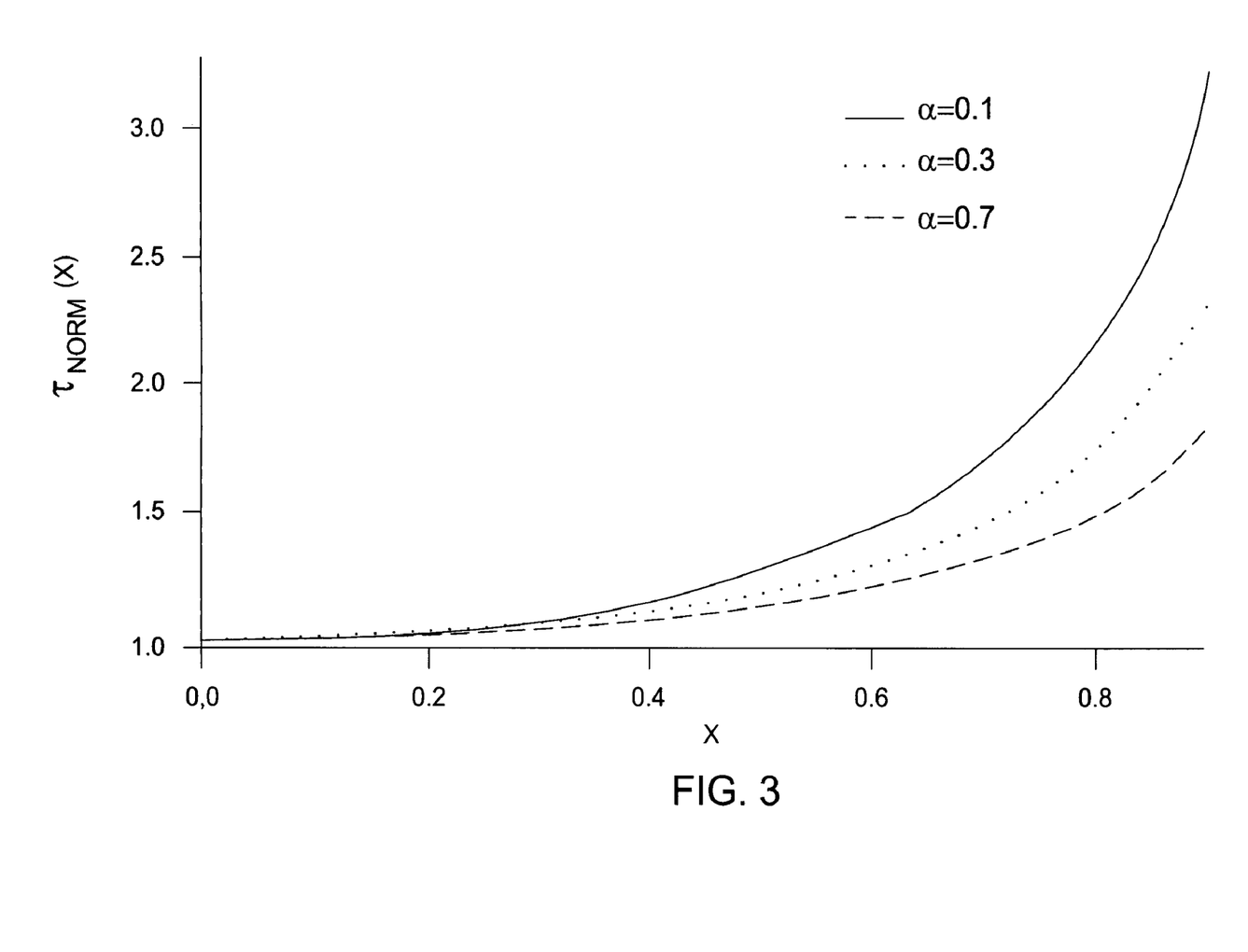
FIG. 3 graphically depicts values of group delay as a function of normalized frequency for different values of the slope of attenuation.

FIG. 3 graphically depicts the group delay of a minimum phase filter as a function of normalized frequency, normalized to the group delay at the center of the filter, for different values of the parameter α. As evident in FIG. 3, for relatively small values of α, the increase in the group delay is more rapid and the dispersion is more significant than for larger values of α. As described above, α is related to the slope of the filter and the attenuation level of β. That is, as the transfer function of a minimum phase filter approaches a square function (e.g., a flatter passband), the slope of the filter becomes steeper and the corresponding α parameter approaches a value of zero. On the other hand, as the passband becomes spectrally wider, the slope of the amplitude function decreases and the value of α increases. As further evident in FIG. 3, the steeper the slope of the attenuation of a minimum phase filter, the higher the dispersion penalty. Evidently, α not only characterizes the squareness of the amplitude response, but also controls the increase in group delay of a minimum phase filter. As such, in one embodiment of the present invention decreasing the slope of the amplitude response by making the bandpass of a minimum phase filter wider, decreases and eventually minimizes the dispersion associated with the minimum phase filter.

Differentiating the equation for the normalized group delay, equation (6), with respect to the normalized frequency (x), derives an equation for quadratic dispersion characterized according to equation seven (7), which follows:

$$D(x) = \frac{\beta}{\pi}\left[\frac{1}{(x-1)^2}\left|\frac{x-1}{x-1-2\alpha}\right|_{sgn}\left[\frac{x-1-2\alpha}{x-1}\right] - \frac{1}{(x+1)(x+1+2\alpha)}\right]. \quad (7)$$

By limiting the evaluation of dispersion to regions inside the passband (x<1) of a minimum phase filter under test, equation (7) above may be simplified to yield equation eight (8), which follows:

$$D(x) = \frac{\beta}{\pi}\left[\frac{4x(1+\alpha)}{(x^2-1)(x^2-(1+2\alpha)^2)}\right]. \quad (8)$$

Equation (8), above, depicts the normalized dispersion of a minimum phase filter under test. To attain an absolute number in dispersion units, such as picoseconds squared (ps²), the normalized dispersion is divided by $\omega_0^2 = 4\pi^2 f_0^2$, where $f_0$ depicts the central frequency of the minimum phase filter under test.

As presented above, the inventors propose a novel means for determining the dispersion characteristics of a minimum phase filter using substantially only an amplitude response of a minimum phase filter under test and the equations determined by the inventors, presented above. In one embodiment of the present invention, the amplitude spectrum (e.g. transfer function), also considered the transmission curve, of a minimum phase filter under test is fitted with a straight line curve as depicted in FIG. 1. Subsequently a parameter, α, is determined for the minimum phase filter by dividing the spectral width of the slope (e.g., transition region) of the minimum phase filter by the filter bandwidth. Using the determined parameter, α, and a maximum tolerable group delay increase within a system (i.e., dictated by, for example, a 1 dB power penalty), together with equation (5) depicted above, the usable bandwidth of the minimum phase filter is determined. As previously disclosed above, the resulting function of equation (5) depicts the relative increase in group delay as the frequency of the minimum phase filter is offset from the central frequency of the filter.

Furthermore, or in the alternative, equation (8) may be used to determine the total dispersion of a minimum phase filter under test using the values determined from the amplitude spectrum of the minimum phase filter, such as the parameter, α.

Figure 4:
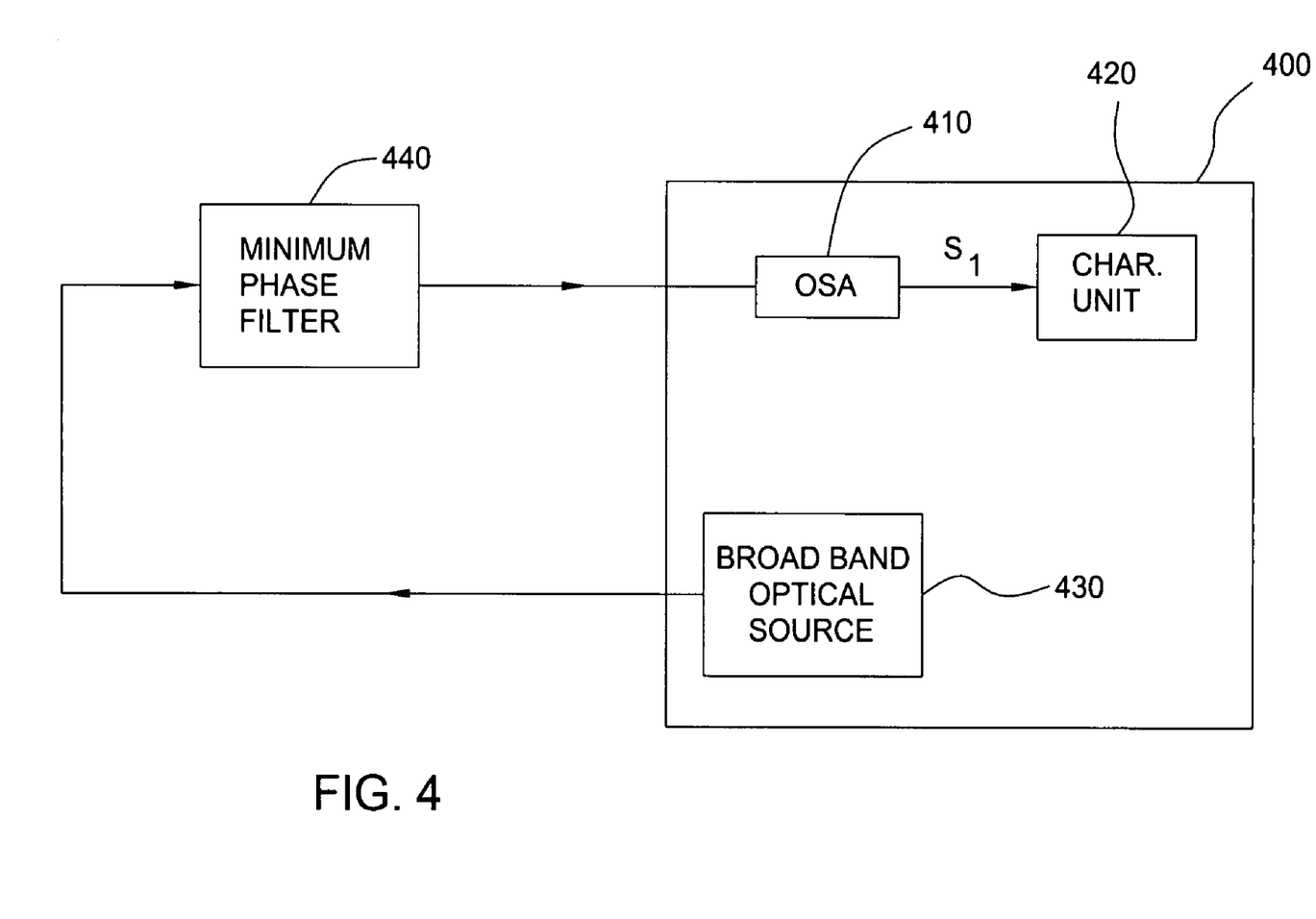
FIG. 4 depicts a high level block diagram of an embodiment of a minimum phase filter characterization device in accordance with the present invention.

FIG. 4 depicts a high level block diagram of an embodiment of a minimum phase filter (MPF) characterization device in accordance with the present invention. The MPF characterization device 400 comprises a detector (illustratively an optical spectrum analyzer (OSA)) 410, a characterization unit 420, and an optical source (illustratively a broadband optical source) 430.

An optical signal from the optical source 430 is communicated to and propagated through a minimum phase filter under test 440. The output of the minimum phase filter under test 440 is communicated to the MPF characterization device 400. The OSA 410 of the MPF characterization device 400 receives the optical output of the minimum phase filter 440 and measures a transmission spectrum curve (e.g., amplitude spectrum) of the optical signal propagated through the minimum phase filter 440. The measurements of the OSA 410 are communicated to the characterization unit 420. The characterization unit 420 uses the transmission spectrum curve measured by the OSA 410 to determine the dispersion characteristics of the minimum phase filter under test 440 as described above. That is, the characterization unit 420 fits the measured transmission spectrum curve of the minimum phase filter under test 440 with a straight line curve and determines the α parameter for the minimum phase filter 440 by dividing the transition region width of the minimum phase filter 440 in the straight line curve by the filter bandwidth. The characterization unit 420 then uses the determined α parameter and a maximum tolerable group delay increase (i.e., dictated by, for example, a 1 dB power penalty), together with equation (5) depicted above, to determine the usable bandwidth of the minimum phase filter 440.

The characterization unit 420 may also determine the total dispersion of the minimum phase filter under test 440 using the transmission spectrum curve measured by the OSA 410 and equation (8) above, stored in the memory of the characterization unit 420.

Figure 5:
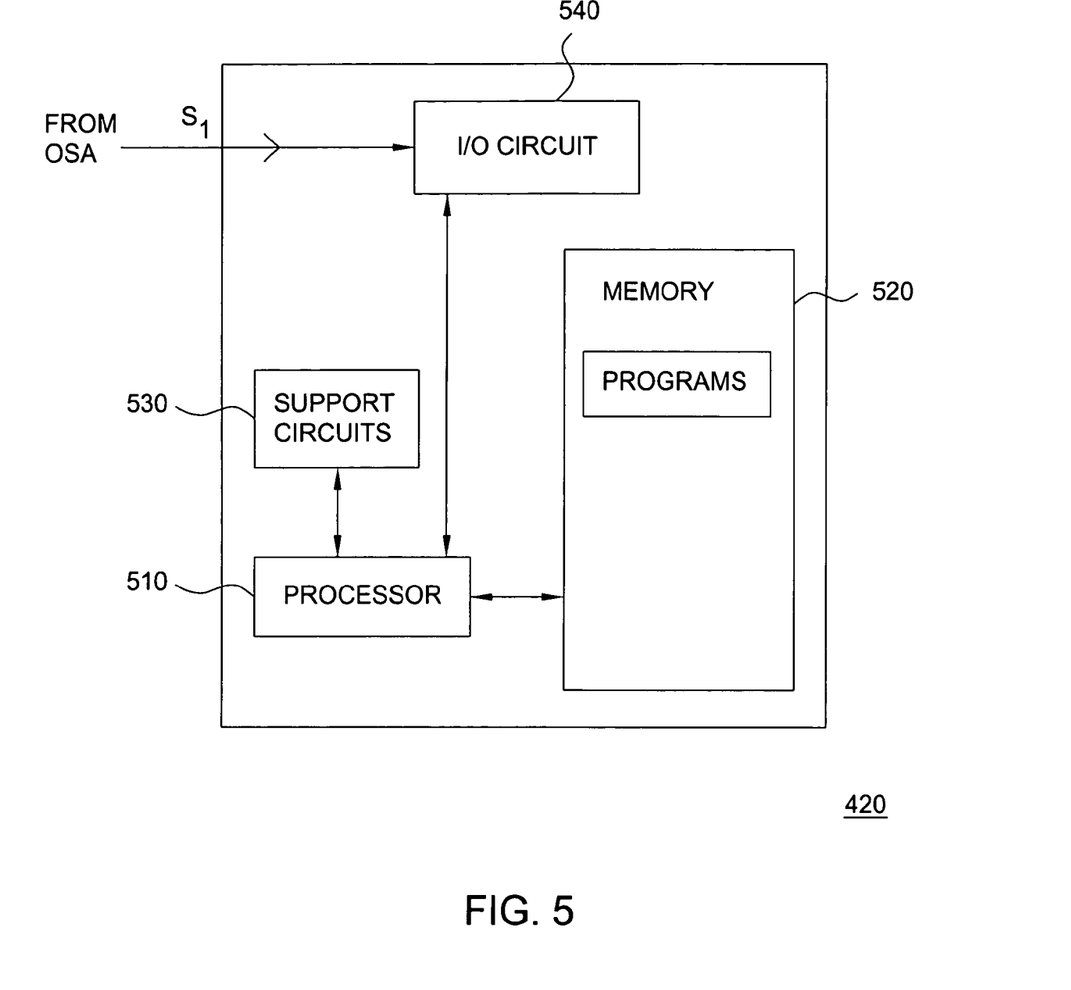
FIG. 5 depicts a block diagram of an embodiment of a characterization unit suitable for use in the minimum phase filter characterization device of FIG. 4.

FIG. 5 depicts a block diagram of an embodiment of a characterization unit 420 suitable for use in the MPF characterization device 400 of FIG. 4. The characterization unit 420 of FIG. 5 comprises a processor 510 as well as a memory 520 for storing algorithms, control programs and the like. The processor 510 cooperates with conventional support circuitry 530 such as power supplies, clock circuits, cache memory and the like as well as circuits that assist in executing the software routines stored in the memory 520. As such, it is contemplated that some of the process steps discussed herein as software processes may be implemented within hardware, for example, as circuitry that cooperates with the processor 510 to perform various steps. The characterization unit 420 also contains input-output circuitry 540 that forms an interface between the various functional elements communicating with the characterization unit 420. For example, in the embodiment of FIG. 4, the characterization unit 420 communicates with the OSA 410 via a signal path S1.

Although the characterization unit 420 of FIG. 5 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although the embodiment of the MPF characterization device 400 of FIG. 4 is depicted as comprising an optical source 430, other embodiments of an MPF characterization device in accordance with the present invention may be configured without an included optical source. As such, an external optical source may be provided by a user for determining the characteristics of a minimum phase filter under test in accordance with the present invention.

In an alternate embodiment of the present invention, the broadband optical source 430 and the OSA 410 of the MPF characterization device 400 of FIG. 4 are replaced with a tunable light source and a photodetector. In this embodiment, the tunable light source is scanned through the bandwidth of a minimum phase filter under test while the amplitude (power) is measured by the photodetector. The dispersion characteristics of a minimum phase filter under test in this embodiment are determined in substantially the same manner as described above for the MPF characterization device 400 of FIG. 4 using the amplitudes measured by the photodetector.

In alternate embodiments of the present invention where the transmission spectrum curve (e.g., amplitude spectrum) of a minimum phase filter under test is known, the values within the transmission spectrum curve required by a characterization unit of an MPF characterization device in accordance with the present invention for determining the dispersion characteristics of the minimum phase filter under test, such as the spectral width of the slope (e.g., the transition region) and the bandwidth of the minimum phase filter under test, are entered into the characterization unit. Such an embodiment of an MPF characterization device in accordance with the present invention would not require a detector or a light source. In this embodiment, the characterization unit of the MPF characterization device determines the useable bandwidth and the dispersion characteristics of the minimum phase filter under test, as described above, using the entered information. Alternatively, a transmission spectrum curve of a minimum phase filter may simply be communicated to a characterization unit of an MPF characterization device in accordance with the present invention for determining the dispersion characteristics of a minimum phase filter under test.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for determining the dispersion characterstics of a minimum phase filter, comprising:

fitting an amplitude spectrum of said minimum phase filter with a substantially straight line curve; and determining the dispersion characteristics of said minimum phase filter using said straight line curve;

wherein said determining the dispersion characteristics comprises:

determining a parameter, α, from the straight line curve of said minimum phase filter by dividing a spectral width of a slope of attenuation in the straight line curve by a bandwidth of said minimum phase filter; and determining a characteristic of said minimum phase filter using a relationship between the characteristic and said determined parameter, α; wherein the characteristic is at least one of dispersion, a useable bandwidth, or a normalized group delay.

2. The method of claim 1, further comprising:

determining the dispersion of said minimum phase filter using said determined parameter, α, and the following equation:

$$D(x) = \frac{\beta}{\pi}\left[\frac{4x(1+\alpha)}{(x^2-1)(x^2-(1+2\alpha)^2)}\right],$$

wherein β depicts a final constant attenuation of the straight line curve of said minimum phase filter, and x depicts a normalized frequency of said minimum phase filter.

3. The method of claim 1, further comprising:

determining the useable bandwidth of said minimum phase filter using said determined parameter, α, a predetermined maximum tolerable group delay increase, and the following equation:

$$\tau_{norm}(x) = \frac{1}{2}\left[\ln\left[\left(\frac{x+1+2\alpha}{x+1}\right)\left|\frac{x-1-2\alpha}{x-1}\right|\right]\right/\ln(1+2\alpha)\right],$$

wherein $\tau_{norm}(x)$ depicts said predetermined maximum tolerable group delay increase, and x depicts a normalized frequency of said minimum phase filter.

4. The method of claim 3, wherein said predetermined maximum tolerable group delay increase is dictated by a 1 dB power penalty.

5. The method of claim 4, wherein said maximum tolerable group delay increase is representative of the dispersion of said minimum phase filter.

6. The method of claim 1, further comprising:
determining the normalized group delay of said minimum phase filter using said determined parameter, $\alpha$, and the following equation:

$$\tau_{norm}(x) = \frac{1}{2}\left[\ln\left[\left(\frac{x+1+2\alpha}{x+1}\right)\left|\frac{x-1-2\alpha}{x-1}\right|\right]\bigg/\ln(1+2\alpha)\right];$$

wherein $\tau_{norm}(x)$ depicts said normalized group delay, and x depicts a normalized frequency of said minimum phase filter.

7. An apparatus for determining the dispersion characteristics of a minimum phase filter, comprising:
an optical source for providing an optical signal to said minimum phase filter;
a detector for measuring the output of said minimum phase filter; and
a controller comprising a memory for storing programs and instructions and a processor for executing said stored programs and instructions, said controller adapted to perform the steps of:
fitting a transmission curve determined from said measured output of said minimum phase filter with a substantially straight line curve;
determining a parameter, $\alpha$, from the straight line curve of said minimum phase filter by dividing a spectral width of a slope of attenuation in the straight line curve by a bandwidth of said minimum phase filter; and
determining a characteristic of said minimum phase filter using a relationship between the characteristic and said determined parameter, $\alpha$; wherein the characteristic is at least one of dispersion, a useable bandwidth, or a normalized group delay.

8. The apparatus of claim 7, wherein said optical source comprises a broadband light source and said detector comprises an optical spectrum analyzer.

9. The apparatus of claim 8, wherein the optical spectrum analyzer measures the amplitude spectrum of said minimum phase filter.

10. The apparatus of claim 7, wherein said optical source comprises a tunable light source and said detector comprises a photodetector.

11. The apparatus of claim 10, wherein said tunable light source is tuned through the bandwidth of said minimum phase filter while the photodetector measures the output power of said minimum phase filter.

12. Computer-readable medium for storing a set of instructions, wherein when said set of instructions is executed by a processor perform a method comprising:
fitting an amplitude spectrum of a minimum phase filter under test with a substantially straight line curve; and
determining dispersion characteristics of said minimum phase filter using said straight line curve;
wherein said determining the dispersion characteristics comprises:
determining a parameter, $\alpha$, from the straight line curve of said minimum phase filter by dividing a spectral width of a slope of attenuation in the straight line curve by a bandwidth of said minimum phase filter; and
determining a characteristic of said minimum phase filter using a relationship between the characteristic and said determined parameter, $\alpha$; wherein the characteristic is at least one of dispersion, a useable bandwidth, or a normalized group delay.

13. The computer-readable medium of claim 12, wherein the amplitude spectrum of said minimum phase filter under test is input by a user.

14. The computer-readable medium of claim 12, further comprising:
determining the dispersion of said minimum phase filter using said determined parameter, $\alpha$, and the following stored equation:

$$D(x) = \frac{\beta}{\pi}\left[\frac{4x(1+\alpha)}{(x^2-1)(x^2-(1+2\alpha)^2)}\right],$$

wherein $\beta$ depicts a final constant attenuation of the straight line curve of said minimum phase filter, and x depicts a normalized frequency of said minimum phase filter.

15. The computer-readable medium of claim 12, further comprising:
determining the useable bandwidth of said minimum phase filter using said determined parameter, $\alpha$, a predetermined maximum tolerable group delay increase, and the following stored equation:

$$\tau_{norm}(x) = \frac{1}{2}\left[\ln\left[\left(\frac{x+1+2\alpha}{x+1}\right)\left|\frac{x-1-2\alpha}{x-1}\right|\right]\bigg/\ln(1+2\alpha)\right],$$

wherein $\tau_{norm}(x)$ depicts said predetermined maximum tolerable group delay increase, and x depicts a normalized frequency of said minimum phase filter.

16. The computer-readable medium of claim 15, wherein said predetermined maximum tolerable group delay increase is dictated by a 1 dB power penalty.

17. The computer-readable medium of claim 12, further comprising:
determining the normalized group delay of said minimum phase filter using said determined parameter, $\alpha$, and the following equation:

$$\tau_{norm}(x) = \frac{1}{2}\left[\ln\left[\left(\frac{x+1+2\alpha}{x+1}\right)\left|\frac{x-1-2\alpha}{x-1}\right|\right]\bigg/\ln(1+2\alpha)\right],$$

wherein $\tau_{norm}(x)$ depicts said normalized group delay, and x depicts a normalized frequency of said minimum phase filter.

* * * * *